United States Patent Office 3,372,019
Patented Mar. 5, 1968

3,372,019
SLOW-RELEASE COATING COMPOSITION CONSISTING OF WAX AND ETHYLENE VINYL-ACETATE
Richard C. Fox, San Rafael, Calif., assignor to Chevron Research Company, a corporation of Delaware
No Drawing. Filed Sept. 28, 1964, Ser. No. 399,855
3 Claims. (Cl. 71—64)

This invention relates to slow-release particles, more particularly, it relates to particles which comprise a water-soluble substance coated with wax-resin mixtures that allow the regulated slow dispersal of the materials into the soil, etc.

With the advent of modern agricultural methods and the increased use of chemical fertilizers, it has become apparent that the development of means to allow the regulated dispersal of plant nutrients and other materials such as weed killers, etc., is of great importance. Areas of particular interest for such products are in the raising of special crops, for example in gardening, planting of forest seedlings, planting nurseries and in home lawns. In each of these cases, it is highly important that the fertilizers be distributed evenly, in order that they not be "burned" by the excessive application to roots, stems and leaves of fertilizer. Additionally, the regulated dispersal allows single application of fertilizer which will last for long periods of time, and requiring less labor. Geographically, such means are of particular interest where rainfall is heavy and depletion of the soil due to leaching is thus high.

Various means have been proposed to effect the slow-release of nutrients, etc. Efforts have been made toward altering the physical and chemical structure of the nutrients themselves. For example, the solubility of the nutrient materials has been reduced in order to inhibit release. Further, the chemical structure of the nutrient has been altered in order that slow-release may be effected. Examples of this approach include the use of urea-formaldehyde nitrogen compound and various chelated materials as fertilizers. Of late, considerable interest has been directed toward means of coating and coating materials for nutrient particles which will retard release and thus prevent rapid leaching.

Numerous coating materials and methods of application have been employed, and efforts to obtain satisfactory controlled release of nutrient material have been made. Among the coating material employed have been petroleum waxes, various chemical resins, asphalt, etc. However, numerous disadvantages have been encountered in the use of most of these materials. Such disadvantages include high cost of material, the inability to provide complete coating or the escape of nutrient material recently recorded, etc.

It has now been found that highly regulated slow-dispersal of various materials can be provided by a slow-release material which is a water-soluble particulate body having a uniformly distributed coating on said body comprising a mixture of 25-95% by weight of wax and from 5-75% by weight of a resinous material selected from the group consisting of (a) a copolymer of an unsaturated ester containing a total of from 3 to 7 carbon atoms with olefins of 2 to 4 carbon atoms, and (b) polymers and copolymers of olefins having from 2 to 4 carbon atoms and wherein said resinous materials have a molecular weight of at least 10,000. By uniformly distributed is meant that at least 80% of the particulate bodies are completely covered with the coating composition. The coatings comprise from 2 to 25% by weight of the slow-release material. Weights of from 5 to 15% are preferred.

Waxes suitable for use in the coating of this invention include paraffin waxes and microcrystalline waxes. Paraffin wax is defined as a solid, crystalline, hydrocarbon mixture wholly derived from that portion of crude petroleum commonly designated petroleum distillate; or from hydrocarbon synthesis by low temperature solidification and expression are by solvent extraction. It is solid at room temperature, and deforms at this temperature only relatively slightly, even under considerable pressure, and has a low viscosity (35-45 SSU) at 200° F. when melted. Microcrystalline waxes have molecular weights of from 400-700 and average molecules of 40 to 50 carbon atoms. They contain a large proportion of side chains and a sizable number of cyclic in it.

Examples of particular resins which may be suitably employed are copolymers of ethylene with ethylacrylate, copolymers of ethylene with vinyl acetate. Example of suitable homogeneous polymers include polyethylene, polypropylene, polymers of 4-methyl-pentene-1, etc. The resins should have a molecular weight between 10,000 and 2,000,000. The range of 20,000 to 500,000 is preferred.

The coating material may be applied to the water-soluble particles by any suitable method. For example, the resin-wax mixture may be melted and the water-soluble bodies stirred into the mixture, separated and allowed to cool. However, the most effective method of application of the coating involves treating the particles in a "curtain coater." This method of coating the material is described in detail in companion application Ser. No. 400,561. A brief description of the process is as follows: the molten resin-wax mixture is discharged in an unbroken substantially rectangular vertical curtain and the water-soluble particles in the form of pellets, etc. are projected in a trajectory through the thin film or "curtain" that has been formed; the particle is allowed to remain in the trajectory after passing through the curtain for a sufficient time for the coating to solidify. The particles then follow through a collecting surface. The coating is supplied in one or more passes of the particles through the coater. Thus, several passes are often required to attain a sufficiently solid coating upon the particles. In general, viscosity of the wax-resinous mixture will be in the range of from 100-2,000,000 cps. at 200° F.

A wide variety of forms of particles can be employed to produce the slow-release materials of this invention. For example, the particles may be crystalline, granular, in flake form, plus pellets, etc. In general, forms that are substantially spherical in shape will be easier to coat. The preferred size of particles are those that will pass through a 4 mesh screen, but will not pass through a 12 mesh.

The plant nutrients that are employed will in general be composed of nitrogen, phosphorous, or potassium; but may include other minor constituent materials. Examples of fertilizers which may be so employed include ammonium nitrate, ammonium sulphate, ammonium phosphate, urea, sodium nitrate, potassium nitrate, calcium nitrate, super-phosphate, dicalcium phosphate, basic calcium phosphate, potassium phosphate and potassium chloride. Also, various blends of these special compounds may be used, for example the mixed fertilizers which are in wide commercial use may also be coated. Examples of other materials which may be improved by the use of the coatings of this invention include the weed killers such as sodium pentachlorophenate pellets and rock salt.

The following examples demonstrate the effectiveness of the coating materials of this invention in reducing the rate of leaching by water. The wax employed in the examples were a 160-165 AMP paraffin wax. The following polymeric additives were employed: (a) ethylenevinyl acetate copolymer having a molecular weight of about 300,000, (b) ethylene-ethylacrylate copolymer.

The plant nutrient material employed was a 16-16-8 nitrogen base fertilizer having a particle size of from 1/16" to 1/8". The wax-polymer coating was applied by passing the fertilizer pellets through the curtain-coater. 1 to 3 passes were employed. Table I, following, shows the amount of fertilizer leached from the coated pellets. In each test, 15 grams of coated fertilizer were charged to each tube. The fertilizer was mixed with a composite soil sample and placed in a 1" diameter tube. The material was leached by successive applications of 150 ml. portions of water. Each application roughly corresponds to irrigation with one foot of water. The time required for completion of the test was about four months.

These data show that the 80% leaching level, the blends of wax and resin A are more than twice as effective as wax alone as coating agents. The fertilizer coated with 15% of the wax-polymer A blend required more than 14 times as much water to leach 60% of the soluble material as that required by the uncoated fertilizer.

Additional data on the coating and leaching of material other than fertilizer is included in the following table. The tests were run under the same conditions as described above. The following materials were used:

(I) 11–8–4 analysis commercial fertilizer

TABLE I.—RATE OF EXTRACTION OF NUTRIENTS FROM COATED FERTILIZERS

| Percent Wax | Additive | | Coating Wt., Percent | Grams Fertilizer Leached After (cc. distilled water)— | | | | | | | | | | | | | |
|---|---|---|---|---|---|---|---|---|---|---|---|---|---|---|---|---|---|
| | Type | Percent | | 150 | 300 | 450 | 600 | 750 | 900 | 1,050 | 1,200 | 1,350 | 1,500 | 1,650 | 1,800 | 1,950 | 2,100 |
| 75 | (a) | 25 | 4.54 | 0.19 | 3.33 | 4.16 | 4.0 | 5.17 | 5.68 | 6.14 | 6.46 | 6.84 | 7.20 | 7.37 | 7.50 | 7.60 | 7.67 |
| 75 | (a) | 25 | 7.93 | 0.74 | 1.63 | 1.86 | 2.1 | 2.32 | 2.67 | 3.34 | 3.77 | 4.47 | 5.48 | 5.88 | 6.32 | 6.72 | 6.93 |
| 75 | (a) | 25 | 13.8 | 0.62 | 0.89 | 1.01 | 1.18 | 1.20 | 1.30 | 1.41 | 1.50 | 1.76 | 2.25 | 2.65 | 3.06 | 3.28 | 3.53 |
| 85 | (a) | 15 | 4.28 | 5.64 | 8.02 | 8.30 | 8.33 | 8.39 | 8.47 | 8.51 | 8.45 | 8.28 | 8.25 | 8.25 | 8.26 | 8.29 | 8.29 |
| 85 | (a) | 15 | 8.4 | 4.33 | 6.89 | 7.28 | 7.49 | 7.57 | 7.66 | 7.73 | 7.72 | 7.61 | 7.60 | 7.60 | 7.61 | 7.62 | 7.61 |
| 85 | (a) | 15 | 13.28 | 0.82 | 3.81 | 4.45 | 4.84 | 5.05 | 5.26 | 5.47 | 5.62 | 5.90 | 6.18 | 6.34 | 6.43 | 6.48 | 6.55 |
| 75 | (b) | 25 | 7.19 | 0.18 | 2.26 | 2.91 | 3.32 | 3.65 | 4.14 | 4.66 | 5.23 | 5.80 | 6.55 | 6.65 | 6.74 | 6.86 | 6.90 |
| 75 | (b) | 25 | 13.07 | 0.00 | 1.10 | 1.45 | 1.65 | 1.79 | 1.93 | 2.11 | 2.26 | 2.63 | 3.17 | 3.44 | 3.69 | 3.92 | 4.06 |
| 05 | (b) | 15 | 5.14 | 1.09 | 5.10 | 5.95 | 6.42 | 6.67 | 6.90 | 7.10 | 7.21 | 7.34 | 7.41 | 7.46 | 7.48 | 7.51 | 7.52 |
| 85 | (b) | 15 | 14.37 | 0.11 | 1.66 | 2.20 | 2.59 | 2.88 | 3.22 | 3.52 | 3.79 | 4.09 | 4.42 | 4.69 | 4.86 | 5.03 | 5.17 |
| 8 | | | 0 | 5.71 | 9.29 | 9.91 | 9.94 | 9.99 | 10.08 | 10.20 | 10.24 | 10.07 | 10.10 | 10.11 | 10.13 | 10.16 | 10.18 |

As shown by the data of the above table, the wax-polymer blends are extremely effective in reducing the amount of loss by leaching. Plotting the cumulative amount of fertilizer leached against the volume of leaching water yield significant results. This plot is shown in Table II. In deriving the data for the table, it was assumed that 10.69 grams of the material constituted 100% of the soluble constituents of the fertilizer, and on this basis (II) Commercial sodium pentachlorophenate weed killer
(III) Rock salt The coatings were applied by the technique of curtain coating as described above. Coating A' is a mixture of 70% of the 160/165 wax employed in the previous tests with 30% of the ethylene-ethylacrylate copolymer also previously employed. Coating B' is a mixture of 70% of the wax with 30% polyethylene.

TABLE III.—GRAMS OF MATERIAL LEACHED FROM WAX-POLYMER COATED PELLETS

| Material Coated | Coating Type | Amount of Coating, Wt. Percent | Cumulative Amount of Water Used, ml. | | | | | | | | |
|---|---|---|---|---|---|---|---|---|---|---|---|
| | | | Combined Results, 150 and 300 | 450 | 600 | 750 | 900 | 1,050 | 1,200 | 1,350 | 1,500 | 1,650 |
| I | | | 9.3868 | .5558 | .4219 | .3877 | .3360 | .2889 | .2542 | .3087 | .2663 | .2281 |
| II | | | 9.7737 | .4455 | .1678 | .1551 | .0848 | .0526 | .0820 | .0434 | .0250 | .0256 |
| III | | | 15.3128 | .5746 | .6746 | .3068 | .2363 | .1813 | .1326 | .0873 | .0691 | .0441 |
| I | A' | 12.05 | 3.0484 | .5505 | .7301 | .7422 | .5406 | .8726 | .8460 | .3532 | .3587 | .1462 |
| II | A' | 28.79 | .1639 | .1928 | .2760 | .2747 | .2836 | .3878 | .5208 | .3275 | .3887 | .2239 |
| III | A' | 16.12 | 6.6510 | 1.1926 | 1.4132 | .9066 | .5676 | .8854 | .8589 | .2953 | .3280 | .1669 |
| I | B' | 11.94 | 6.3917 | .7335 | .4224 | .2845 | .1953 | .2201 | .2613 | .2128 | .2096 | .1366 |
| I | B' | 15.49 | 3.9742 | .7575 | .5983 | .3994 | .2737 | .3497 | .3648 | .2007 | .2191 | .0974 |
| I | B' | 18.60 | .8978 | .5030 | .5632 | .5550 | .3865 | .5856 | .6630 | .3133 | .2653 | .1099 |
| II | B' | 10.13 | 5.8391 | 1.3743 | .8292 | .4664 | .2696 | .1704 | .1418 | .1034 | .1363 | .0444 |
| III | B' | 25.22 | 4.8558 | .8999 | 1.2100 | .6506 | .3876 | .6154 | .6930 | .2369 | .3926 | .1808 |

| Material Coated | Coating Type | Amount of Coating, Wt. Percent | Cumulative Amount of Water Used, ml. | | | | | | | | | |
|---|---|---|---|---|---|---|---|---|---|---|---|---|
| | | | 1,800 | 1,950 | 2,100 | 2,250 | 2,400 | 2,550 | 2,700 | 2,850 | 3,000 | Totals |
| I | | | .1830 | .1335 | .0768 | .0600 | .0223 | .0258 | .0241 | .0342 | .0121 | 13.0063 |
| II | | | .0161 | .0278 | .0092 | .0195 | .0056 | .0105 | .0013 | .0183 | .0014 | 10.9624 |
| III | | | .0236 | .0302 | .0271 | .0175 | .0166 | .0354 | .0163 | .00321 | .0214 | 17.8394 |
| I | A' | 12.05 | .1292 | .1526 | .1227 | .0960 | .0998 | .0967 | .0544 | .0749 | .0668 | 9.1811 |
| II | A' | 28.79 | .1719 | .2167 | .2018 | .1434 | .1755 | .1484 | .0987 | .0960 | .1016 | 4.3937 |
| III | A' | 16.12 | .2138 | .1764 | .1656 | .1210 | .1341 | .0824 | .0990 | .0966 | .0791 | 14.4335 |
| I | B' | 11.94 | .1220 | | | | | | | | | 9.1898 |
| I | B' | 15.49 | .0922 | | | | | | | | | 7.3270 |
| I | B' | 18.60 | .0926 | .1135 | .0773 | .0648 | .0750 | .1113 | .0270 | .0425 | .0326 | 5.4792 |
| II | B' | 10.13 | .0342 | | | | | | | | | 9.4091 |
| III | B' | 25.22 | .1352 | .1651 | .1288 | .0905 | .0901 | .0876 | .0722 | .0532 | .0375 | 10.9828 | the amount of water required to remove various percentages of soluble fertilizer was read from the table.

TABLE II.—VOLUME OF WATER TO LEACH GIVEN PERCENT (ASSUMING 10.69 g.=100%) (ml.)

| Coating | Percent | | | | |
|---|---|---|---|---|---|
| | 50 | 60 | 70 | 80 | 90 |
| Uncoated | 120 | 140 | 170 | 200 | 240 |
| 2.5% Wax | 200 | 220 | 250 | 470 | |
| 2.5% Wax, A | 210 | 240 | 260 | (>1,000) | |
| 5.0% Wax | 200 | 220 | 250 | 450 | |
| 5.0% Wax, A | 260 | 280 | 350 | (>1,000) | |
| 10.% Wax, A | 300 | 740 | 1,260 | 1,670 | |
| 15.0% Wax, A | 1,400 | >2,000 | | | |

As shown by these data the coating is applicable for the slow-release of any water-soluble material that one may wish to coat.

I claim:
1. As a slow-release material, a water-soluble particulate body having a uniformly distributed coating on said body comprising a mixture of from 25 to 95% by weight of a wax and from 5 to 75% by weight of a copolymer of ethylene and vinyl acetate, and wherein said coating comprises from 2 to 25% by weight of said material.

2. The material of claim 1 wherein the water-soluble particulate body is a plant nutrient.

3. The material of claim 1 wherein said coating comprises from 5 to 15% by weight of said material.

References Cited

UNITED STATES PATENTS

| | | | |
|---|---|---|---|
| 3,288,587 | 11/1966 | Campbell et al. | 71—64 |
| 3,223,518 | 12/1965 | Hansen | 71—64 |
| 3,232,895 | 2/1966 | Klein et al. | 106—230 |

DONALL H. SYLVESTER, *Primary Examiner.*

R. BAJEFSKY, *Assistant Examiner.*